(12) United States Patent
Tang et al.

(10) Patent No.: US 11,837,816 B2
(45) Date of Patent: Dec. 5, 2023

(54) METHOD OF SEALING CABLE EXIT FOR MOISTURE AND VAPOR INTRUSION

(71) Applicant: HYDRA-ELECTRIC COMPANY, Burbank, CA (US)

(72) Inventors: John Chick Hong Tang, Monterey Park, CA (US); Robert Andrew Guziak, Thousand Oaks, CA (US)

(73) Assignee: HYDRA-ELECTRIC COMPANY, Burbank, CA (US)

( * ) Notice: Subject to any disclaimer, the term of this patent is extended or adjusted under 35 U.S.C. 154(b) by 372 days.

(21) Appl. No.: 17/059,620

(22) PCT Filed: May 31, 2019

(86) PCT No.: PCT/US2019/034924
§ 371 (c)(1),
(2) Date: Nov. 30, 2020

(87) PCT Pub. No.: WO2019/232386
PCT Pub. Date: Dec. 5, 2019

(65) Prior Publication Data
US 2021/0265769 A1 Aug. 26, 2021

Related U.S. Application Data

(60) Provisional application No. 62/678,615, filed on May 31, 2018.

(51) Int. Cl.
*H01R 13/52* (2006.01)
*H01B 17/58* (2006.01)
(Continued)

(52) U.S. Cl.
CPC ....... *H01R 13/5208* (2013.01); *H01B 17/583* (2013.01); *H01R 9/11* (2013.01);
(Continued)

(58) Field of Classification Search
None
See application file for complete search history.

(56) References Cited

U.S. PATENT DOCUMENTS

| 25,739 | A | * | 10/1859 | Johnson | ............... | H01B 7/2825 |
| | | | | | | 174/107 |
| 2,963,536 | A | * | 12/1960 | Kokalas | ............. | H01R 13/5208 |
| | | | | | | 174/653 |

(Continued)

FOREIGN PATENT DOCUMENTS

| DE | 102005022937 B4 * 11/2013 | ........... H02G 15/013 |
| EP | 0883006 B1 * 2/2005 | |

(Continued)

OTHER PUBLICATIONS

International Search Report and Written Opinion for PCT/US19/34924, dated Aug. 12, 2019.

*Primary Examiner* — Timothy J. Dole
*Assistant Examiner* — Muhammed Azam
(74) *Attorney, Agent, or Firm* — Concept IP LLP; Michael Zarrabian (57) ABSTRACT

Systems, devices, and methods including one or more isolation breaks connected between one or more first portions of a first wire and one or more second portions of a second wire, wherein the one or more isolation breaks prevent moisture intrusion between the one or more first portions of the first wire and the one or more second portions of the second wire; an inner housing; an upper compressing plate; a lower compressing plate; a grommet and an outer housing sized to receive the inner housing; where the one or more isolation breaks are connected between the one or more first portions of the first wire and the one or more second portions of the second wire prior to compressing the grommet between the upper compressing plate and the lower compressing plate.

20 Claims, 7 Drawing Sheets

(51) Int. Cl.
    *H01R 9/11*    (2006.01)
    *H02G 15/013*    (2006.01)
    *H01R 13/533*    (2006.01)

(52) U.S. Cl.
    CPC ......... *H02G 15/013* (2013.01); *H01R 13/533* (2013.01); *H01R 2201/26* (2013.01)

(56) References Cited

U.S. PATENT DOCUMENTS

| | | | | |
|---|---|---|---|---|
| 3,091,750 | A | | 5/1963 | Long et al. |
| 3,458,649 | A | * | 7/1969 | Channell ............... H02G 15/192 174/93 |
| 3,827,704 | A | * | 8/1974 | Gillemot ............... H02G 15/013 277/606 |
| 3,848,074 | A | * | 11/1974 | Channell ............... H02G 15/076 277/609 |
| 5,055,636 | A | * | 10/1991 | Jaycox ................ H02G 9/10 156/49 |
| 5,059,748 | A | * | 10/1991 | Allen ................. H01R 13/5216 174/93 |
| 5,117,067 | A | * | 5/1992 | Jaycox ................ H02G 15/013 174/93 |
| 5,149,274 | A | * | 9/1992 | Gallusser ............... H01R 29/00 439/83 |
| 5,235,134 | A | * | 8/1993 | Jaycox ................ H02G 9/10 156/49 |
| 5,247,424 | A | * | 9/1993 | Harris ................ H01R 13/5202 174/547 |
| 5,256,081 | A | * | 10/1993 | Didier ................ H01R 13/5202 439/274 |
| 5,502,282 | A | * | 3/1996 | Kunze ................ H02G 15/013 174/93 |
| 5,616,049 | A | * | 4/1997 | Schwager ............ H01R 13/533 439/589 |
| 5,639,992 | A | * | 6/1997 | Debbaut ............... H01B 17/60 174/92 |
| 5,757,729 | A | * | 5/1998 | Cheema ............... H01R 13/533 367/188 |
| 5,789,707 | A | * | 8/1998 | Damm ................ H02G 15/113 174/650 |
| 5,817,978 | A | * | 10/1998 | Hermant ............... H02G 15/184 174/75 C |
| 6,325,669 | B1 | * | 12/2001 | Safai .................... H01R 13/443 439/587 |
| 6,752,633 | B2 | * | 6/2004 | Aizawa ............ H01R 13/65914 439/63 |
| 7,218,511 | B1 | * | 5/2007 | Strozyk ................ H02G 3/0493 361/679.01 |
| 7,229,325 | B1 | * | 6/2007 | Flynn .................... H01R 9/223 439/798 |
| 7,232,347 | B1 | * | 6/2007 | Moore ................. H02G 15/113 174/89 |
| 8,523,584 | B2 | * | 9/2013 | Ton .................... H01R 13/5208 439/204 |
| 8,935,844 | B2 | * | 1/2015 | Ramgattie ............... H02G 9/02 174/64 |
| 9,548,572 | B2 | * | 1/2017 | Burris ................. H01R 13/6591 |
| 9,966,211 | B1 | * | 5/2018 | Tang ................... H01H 35/34 |
| 9,978,549 | B1 | * | 5/2018 | Tang ................... H01H 35/2614 |
| 11,374,343 | B2 | * | 6/2022 | Price ................. H01R 13/5205 |
| 2005/0026488 | A1 | * | 2/2005 | Janssen ............. H01R 13/5208 439/275 |
| 2008/0196919 | A1 | * | 8/2008 | SteinIch ................ H02G 3/088 73/431 |
| 2010/0291782 | A1 | * | 11/2010 | Wade ................ H01R 13/5208 439/271 |
| 2013/0032395 | A1 | * | 2/2013 | Smoll ................. H01R 43/005 29/874 |
| 2014/0187066 | A1 | * | 7/2014 | Kojima ................ H01R 13/453 439/136 |

FOREIGN PATENT DOCUMENTS

| | | | | |
|---|---|---|---|---|
| FR | 2196537 | A1 | * | 3/1974 |
| FR | 2292359 | A1 | * | 6/1976 |
| FR | 2450514 | A1 | * | 9/1980 |
| FR | 2758017 | A1 | * | 7/1998 | ......... H02G 15/013 |
| GB | 1504004 | A | | 3/1978 |
| WO | WO-8606561 | A1 | * | 11/1986 |
| WO | WO-9326071 | A1 | * | 12/1993 | ......... H02G 15/076 |
| WO | WO-9933154 | A1 | * | 7/1999 | ......... H02G 15/013 |
| WO | WO-2007137718 | A1 | * | 12/2007 | ......... G02B 6/4444 |
| WO | WO-2010105268 | A1 | * | 9/2010 | ......... G01D 11/245 |
| WO | WO-2019232386 | A1 | * | 12/2019 | ......... H01B 17/583 |

\* cited by examiner

FIG. 6

METHOD OF SEALING CABLE EXIT FOR MOISTURE AND VAPOR INTRUSION

CROSS-REFERENCE TO RELATED APPLICATIONS

This application is a 35 U.S.C § 371 National Stage Entry of International Application No. PCT/US19/34924 filed May 31, 2019, which claims the priority benefit of U.S. Provisional Patent Application Ser. No. 62/678,615 filed May 31, 2018, all of which are incorporated herein by reference in their entirety for all purposes.

FIELD OF ENDEAVOR

The invention relates to moisture sealing, and more particularly to sealing cables.

BACKGROUND

Cables may require sealing at an entry point into a device such as a sensor or a switch. In certain applications, such as aircraft, variations in temperature, humidity, and pressure all change in a way that causes moisture to be pulled into a device. In the cold high altitudes, moisture in the device turns into ice, which expands and may cause physical damage that aggregates the problem. Insulation resistance (IR) for traditional cable sealing breaks down at less than 100 cycles.

SUMMARY

A system embodiment may include: one or more isolation breaks connected between one or more first portions of a wire and one or more second portions of a wire; an inner housing having one or more first apertures to receive the wire; an upper compressing plate having one or more second apertures to receive the wire; a lower compressing plate having one or more third apertures to receive the wire; a rubber grommet having one or more fourth apertures to receive the one or more metal isolation breaks and the wire; and an outer housing sized to receive the metal inner housing, where the inner housing may be placed in at least a portion of the outer housing; where the grommet is disposed between the upper compressing plate and the lower compressing plate; and wherein the inner housing compresses the grommet between the upper compressing plate and the lower compressing plate to form a seal about the one or more metal isolation breaks.

In additional system embodiments, the inner housing may be a metal inner housing and the grommet may be a rubber grommet. The one or more first apertures may receive at least one of: the one or more first portions of the wire and the one or more second portions of the wire. The inner housing may include a first volume and a second volume. The one or more second apertures may receive at least one of: the one or more first portions of the wire and the one or more second portions of the wire. The upper compressing plate may further include one or more indentations about each of the one or more second apertures. The grommet may include one or more protrusions about each of the one or more fourth apertures. The grommet compression may fill the one or more protrusions into the one or more indentations.

In other system embodiments, the one or more third apertures may receive at least one of: the one or more first portions of the wire and the one or more second portions of the wire. The one or more fourth apertures further receive the one or more first portions of the wire, and the one or more second portions of the wire. The outer housing may include a flange sized to receive the inner housing. The inner housing may be placed in at least a portion of the flange of the outer housing. The one or more first apertures, the one or more second apertures, the one or more third apertures, and the one or more fourth apertures may be aligned. The lower compressing plate may be held in place by the outer housing.

A method embodiment may include: inserting at least one of: one or more first portions of a wire and one or more second portions of a wire through one or more first apertures of an inner housing, through one or more second apertures of an upper compressing plate, through one or more third apertures of a lower compressing plate, and through one or more fourth apertures of a grommet; connecting the one or more first portions of the wire to the one or more second portions of the wire via one or more isolation breaks; positioning the one or more isolation breaks within the grommet; and inserting the inner housing into at least a portion of an outer housing; where the inner housing may compress the grommet between the upper compressing plate and the lower compressing plate to form a seal about the one or more isolation breaks.

In additional method embodiments, the inner housing may be a metal inner housing and the grommet may be a rubber grommet. The grommet may have one or more protrusions and the upper compressing plate may have one or more indentations corresponding to the one or more protrusions of the grommet. The one or more protrusions of the grommet may be filled into the one or more corresponding indentations of the upper plastic plate via the compression of the grommet between the upper compressing plate and the lower compressing plate.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The following description is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The system and method disclosed herein allow for sealing wires that exit an electrical assembly, such as but not limited to a pressure sensor or pressure switch, to prevent moisture, humidity, and/or gaseous intrusion into the electrical assembly. The system may be used to protect devices such as those used in aircraft which are exposed to high humidity, high and low temperatures, and changing altitude from failing for dielectric and insulation resistance due to icing conditions. The system resists the effects of cycling through high and low temperature, changing altitude, and high and low humidity, such as found in aircraft applications. The system provides an active seal instead of a passive seal. The system seals against the ingress of moisture, which is a cause of dielectric failure, under the varied atmospheric conditions. The system minimizes and/or eliminates failure modes allowing moisture ingresses such as material delamination, cracking, diffusion, capillary action, direct flow, and thermal pumping.

The outer diameter of each individual electrical interconnect is actively sealed, which maintains a moisture and humid atmosphere barrier even during thermal and pressure cycling as well as exposure to icing conditions. Wire strain relief is provided as a result of a rubber grommet expanding within the housing, preventing the wire from being pulled back through the exit hole in the housing. The flow of gas or moisture is blocked through the inner strands of the wires with the isolation breaks. A gas-tight seal is provided for the purpose of eliminating dielectric and insulation resistance failures.

Figure 1A:
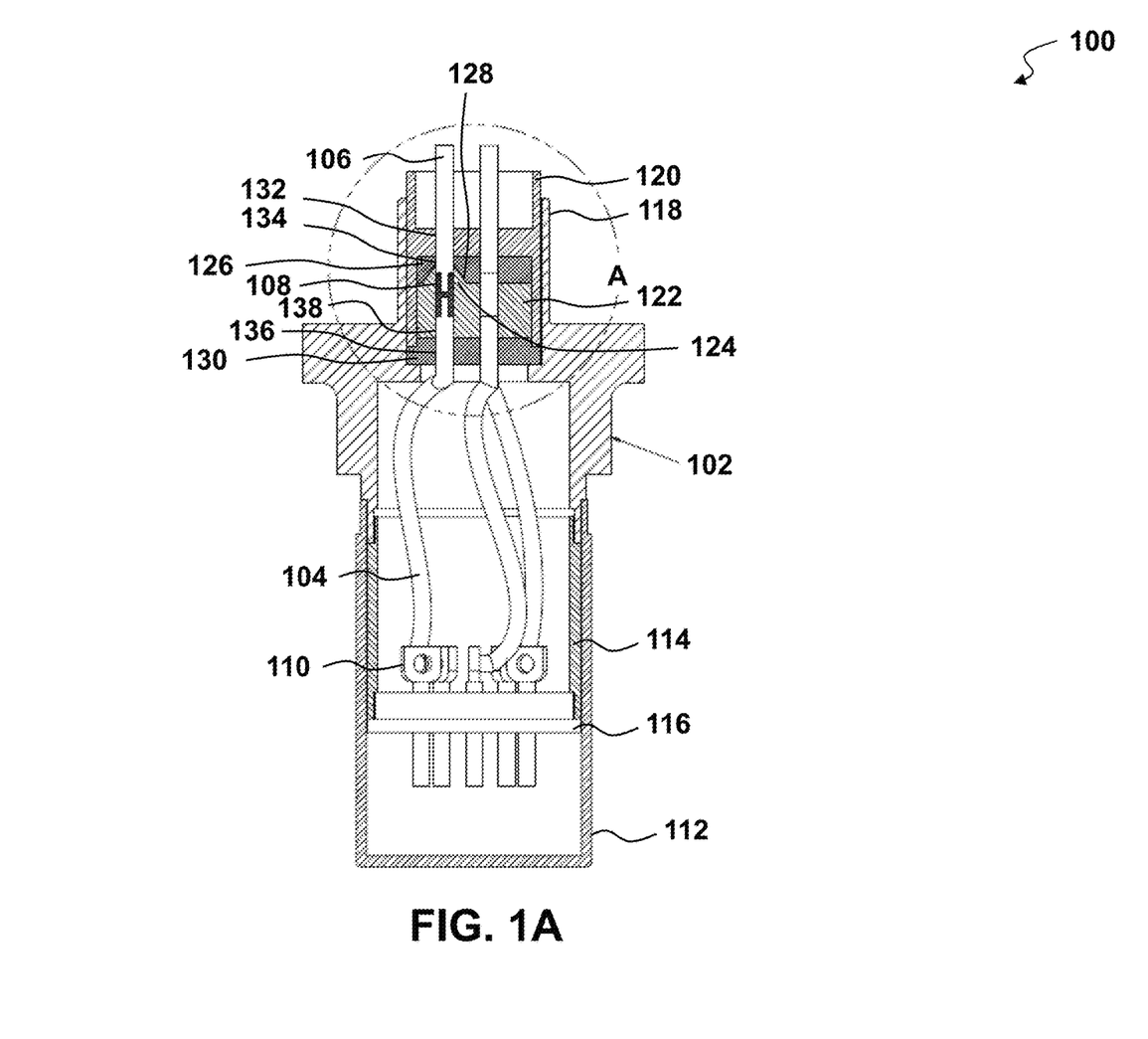
FIG. 1A depicts a partial cutaway exploded view of a system for sealing a cable at an entry point.
Figure 1B:
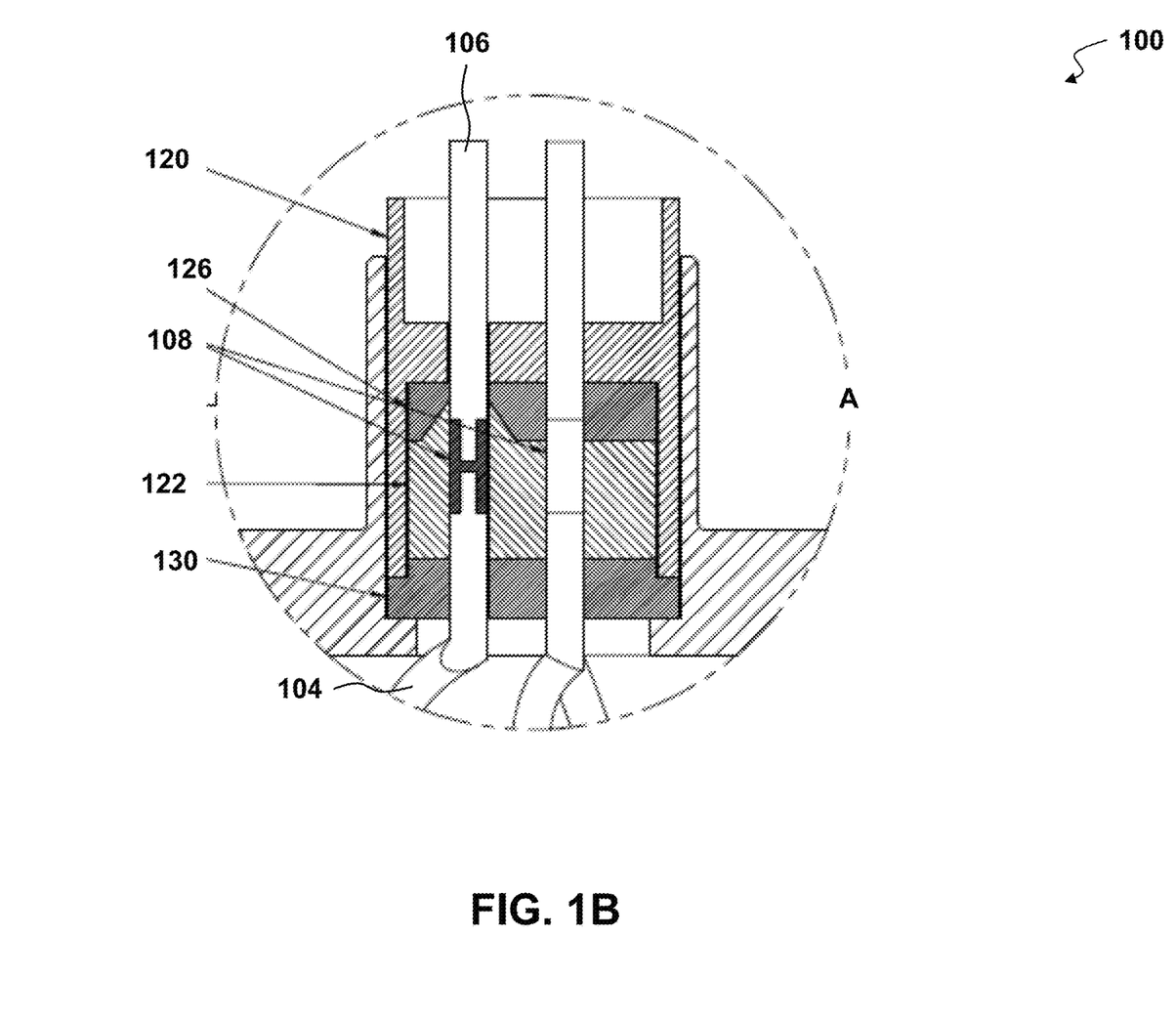
FIG. 1B depicts a close-up view of the system of FIG. 1 about circle A.

FIG. 1A depicts a partial cutaway exploded view of a system 100 for sealing a cable at an entry point. FIG. 1B depicts a close-up view of the system 100 of FIG. 1A about circle A. The system 100 includes one or more metal isolation breaks 108 connected between one or more first portions of a wire 104 and one or more second portions of a wire 106. The metal isolation break 108 provides an airtight seal for the multiple-stranded conductors inside the wires 104, 106 once the isolation breaks are joined between the ends of the wires 104, 106. In some embodiments, the one or more metal isolation breaks 108 may be a single piece. In other embodiments, the one or more metal isolation breaks 108 may be two pieces that slide into each other as in a male and a female. The two-piece metal isolation break 108 may simplify the assembly of wire 104 and wire 106 to the break 108. The two-piece break 108 may be a male and a female connector pin set. This two-part break 108 may provide simplicity of assembly and reduced cost as compared to a one-piece break 108. The two-part connector may eliminate a pathway for moisture to travel, as through capillary action, with the added benefit of simplicity.

The first portions of the wire 104 may be connected to respective terminals 110. In one embodiment, the terminals 110 are crimp terminals. In other embodiments, the first portions of the wire 104 may be connected to their respective terminals 108 via one or more eyelets, one or more crimping connectors, one or more heat shrink connectors, one or more screw connectors, one or more push-in connectors, or the like. Other types of terminals are possible and contemplated. The second portions of the wire 106 may exit the outer housing 102.

A metal inner housing 120 may include one or more first apertures 132 to receive the one or more first portions of the wire 104 and/or the one or more second portions of the wire 106. The first aperture 132 may be sized to receive the wire 104. In some embodiments, a diameter of the first aperture 132 may be substantially equal to an outer diameter of the wire 104.

An upper compressing plate 126, typically plastic but may be metal or composite or ceramic or similar structural material, may include one or more second apertures 134 to receive the one or more first portions of the wire 104 and/or the one or more second portions of the wire 106. The second aperture 134 may be sized to receive the wire 104. In some embodiments, a diameter of the second aperture 134 may be substantially equal to an outer diameter of the wire 104. The upper plate 126 may further include one or more indentations 128 about each of the one or more second apertures 134. The upper plate 126 may be used to compress a rubber grommet 122 from above. In some embodiments, the rubber grommet may be a rubber ring, edge strip, or eyelet. The upper plate 126 may be held in place by the inner housing 120.

A lower compressing plate 130, typically plastic but may be metal or composite or ceramic or similar structural material, may include one or more third apertures 136 to receive the one or more first portions of the wire 104 and/or the one or more second portions of the wire 106. The third aperture 136 may be sized to receive the wire 104. In some embodiments, a diameter of the third aperture 136 may be substantially equal to an outer diameter of the wire 104. The lower plate 130 is used to compress the rubber grommet 122 from below. The lower plate 130 may sit on a step in the outer housing 102. When the metal isolation break 108 is joined to each end of the wire 104, 106 between the upper plate 126 and the lower plate 130 any moisture is prevented from getting through the inner strands of the wires 104, 106.

The rubber grommet 122 may include one or more fourth apertures 138 to receive the one or more metal isolation breaks 108, the one or more first portions of the wire 104, and the one or more second portions of the wire 106. The fourth apertures 138 may be sized to receive the wire 104. In some embodiments, a diameter of the fourth apertures 138 may be substantially equal to an outer diameter of the wire 104. The rubber grommet 122 may include one or more protrusions 124 or bosses about each of the one or more fourth apertures 138. The rubber grommet 122 may seal around the outside diameter of each individual wire 104, 106. The rubber grommet 122 may be compressed by the two plates 126, 130. The active seal is achieved by compressing the rubber grommet 122 around the outside diameter of each individual wire 104, 106. The compression of the rubber grommet 122 allows the rubber grommet 122 to maintain its sealing ability during thermal expansion and contraction of the surrounding materials. The rubber grommet 122 is used to seal the outside diameter of each individual wire 104, 106. Once slipped over the wires 104, 106 and seated between the plates 126, 130, the rubber grommet 122 is compressed to form a tight seal.

In one embodiment, the upper end of the rubber grommet 122 has three cone-shaped protrusions 124 or bosses that are compressed by the upper plate 126 with matching cone-shaped indentations 126 or pockets, resulting in a radially inward force on the outer diameter of each individual wire 104, 106. The lower end of the rubber grommet 122 may be compressed by the lower plate 130 through the inner housing 120, resulting in an outward expansion of the grommet 122 and forming an airtight seal. Prior to compressing the seal into place, the metal isolation break 108 may be joined between the ends of each connecting wire 104, 106 to prevent moisture intrusion from between, and through, the lead wire. While three wires are shown, any number of wires may be sealed via the system and method disclosed herein.

The outer housing 120 may include a flange 118 sized to receive the metal inner housing 120. The metal inner housing 120 may be placed in at least a portion of the flange 118 of the outer housing 102. A second housing 112, third housing 114, and fourth housing 116 may be connected to the outer housing 120. In some embodiments, the housing may be a single part or any number of parts.

The one or more first apertures 132, the one or more second apertures 134, the one or more third apertures 136, and the one or more fourth apertures 138 may be substantially aligned. The rubber grommet 122 may be disposed between the upper plate 126 and the lower plate 130. The lower plate 130 may be held in place by the outer housing 102. In some embodiments, the upper plate 126, lower plate 130, outer housing 102, and inner housing 120 may be made from plastic, metal, or any other suitable material.

The metal inner housing 120 may compress the rubber grommet 122 between the upper plate 126 and the lower plate 130 to form a seal about the one or more metal isolation breaks 108. The grommet compression may fill the one or more protrusions 124 of the rubber grommet 122 into the one or more indentations 126 of the upper plate 126.

Figure 2:
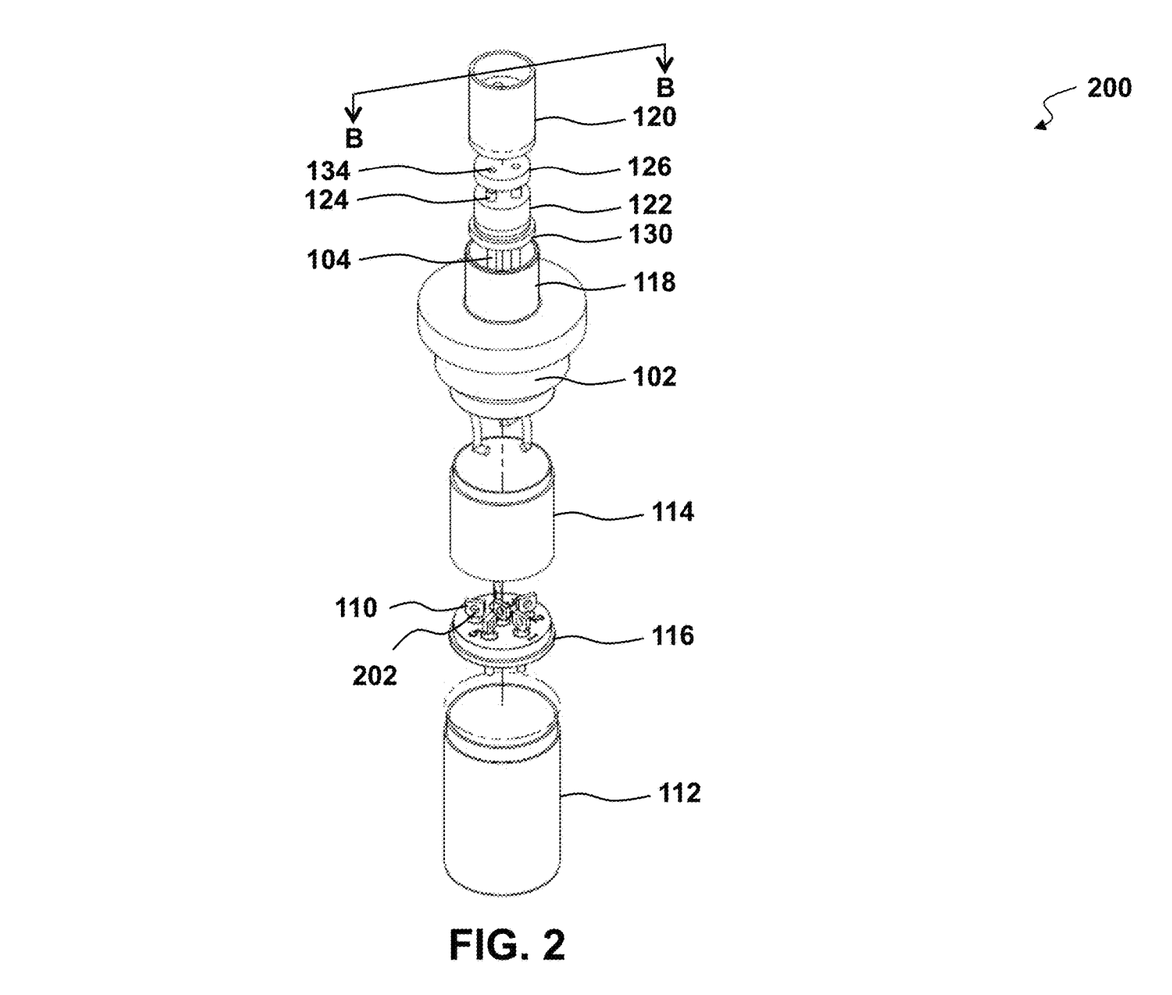
FIG. 2 depicts a perspective exploded view of another system for sealing a cable at an entry point.

FIG. 2 depicts a perspective exploded view of another system 200 for sealing a cable at an entry point. The system 200 may include a metal inner housing 120; an upper plate 126; a rubber grommet 122 with one or more protrusions 124; an outer housing 102 having a flange 118; a second housing 112, a third housing 114, and a fourth housing 116 that may be connected to the outer housing 120; and one or more terminals 110 on the fourth housing 116. The one or more terminals 110 may each include an aperture 202 for connecting a wire, such as by soldering.

Figure 3:
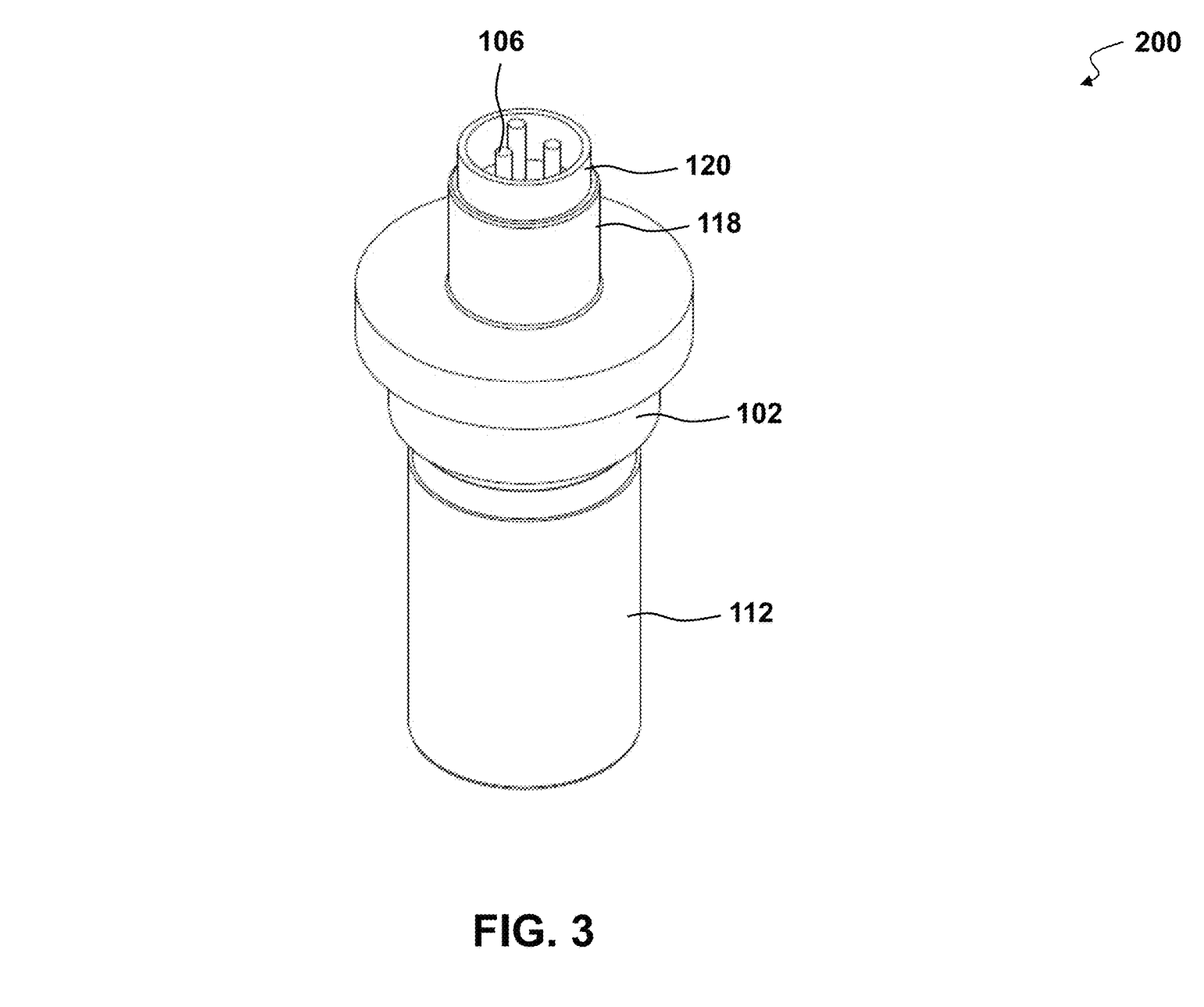
FIG. 3 depicts a perspective assembled view of the system of FIG. 2.

FIG. 3 depicts a perspective assembled view of the system 200 of FIG. 2. The second portion of the wire 106 exits the outer housing 102. The metal inner housing 120 is disposed within a portion of the flange 118 to compress the upper plate and lower plate about the rubber grommet, as shown in FIG. 1A. A second housing 112 may be attached to the outer housing 102 to seal the housing together.

Figure 4:
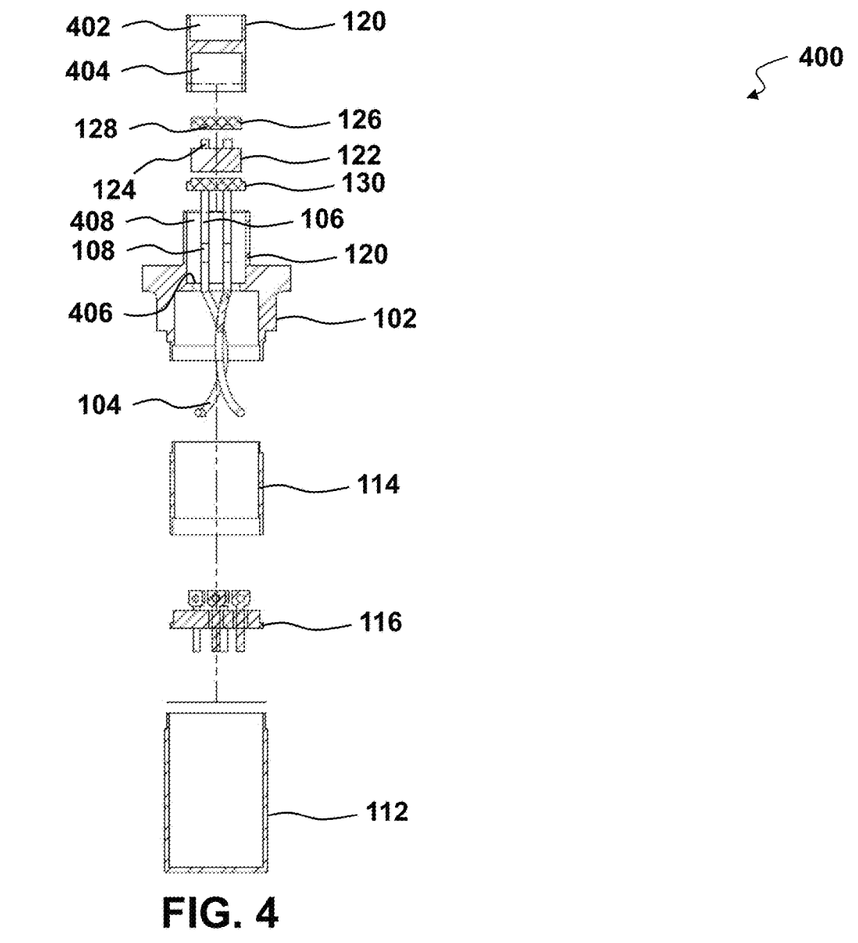
FIG. 4 depicts a cross-section exploded view of the system of FIG. 2 about line B-B.

FIG. 4 depicts a cross-section exploded view 400 of the system of FIG. 2 about line B-B. The metal inner housing 120 may include a first volume 402 and a second volume 404. The first volume 402 may have a hollow end oriented away from the outer housing 102. The first volume 402 may contain the second portions of the wire when the device is assembled and the wires 104, 106 are sealed from moisture intrusion. The second volume 404 may have a hollow end oriented toward the outer housing 102. The first volume 402 and the second volume 404 may be connected by one or more first apertures sized to receive the wires 104, 106. While two sets of wires are shown, any number of wires may be used depending on the device.

The upper plate 126 may further include one or more indentations 128 about each of the one or more second apertures. The upper plate 126 may be used to compress the rubber grommet 122 from above. The upper plate 126 may be held in place by the inner housing 120. The upper plate 126 may be fit into the second volume 404 of the inner housing 120. The outer diameter of the upper plate 126 may be substantially equal to the inner diameter of the second volume 404. The inner housing 120, the upper plate 126, and the lower plate 130 may all be made of a substantially rigid material. The rubber grommet 122 may be made of a material having high compressibility such that the rubber grommet 122 may be compressed between the upper plate 126 and the lower plate 130. The rubber grommet may be made from rubber or any other material having high compressibility. The rubber grommet 122 may include one or more protrusions 124 or bosses about each of the one or more fourth apertures proximate where the wire 104, 106 goes through the rubber grommet 122. The wire 104, 106 may go through corresponding apertures in each of the inner housing 120, upper plate 126, rubber grommet 122, and lower plate 130 to form a connection of the wire from outside of the housing to inside the housing while preventing moisture intrusion. The one or more protrusions 124 of the rubber grommet 122 may be compressed into the one or more indentations 128 of the upper plate. The one or more protrusions 124 of the rubber grommet 122 may have a generally rectangular, square, dome, or the like cross-section. In some embodiments, the rubber grommet 122 may not have any protrusions and/or the upper plate 126 may not have any indentations.

The housing base 406 may receive the lower plate 130 in the housing 102. The lower plate 130, rubber grommet 122, upper plate 126, and inner housing 120 are inserted into a housing volume 408. The rubber grommet 122 is compressed about the wires 104, 106 by the upper plate 126 and lower plate 130 which are held in place by the inner housing 120 and the housing base 406. The second housing 112, the third housing 114, and the fourth housing 116 may be connected to the outer housing 120. The housing may include any number of parts, such as a single piece, two pieces, or two or more pieces.

Figure 5:
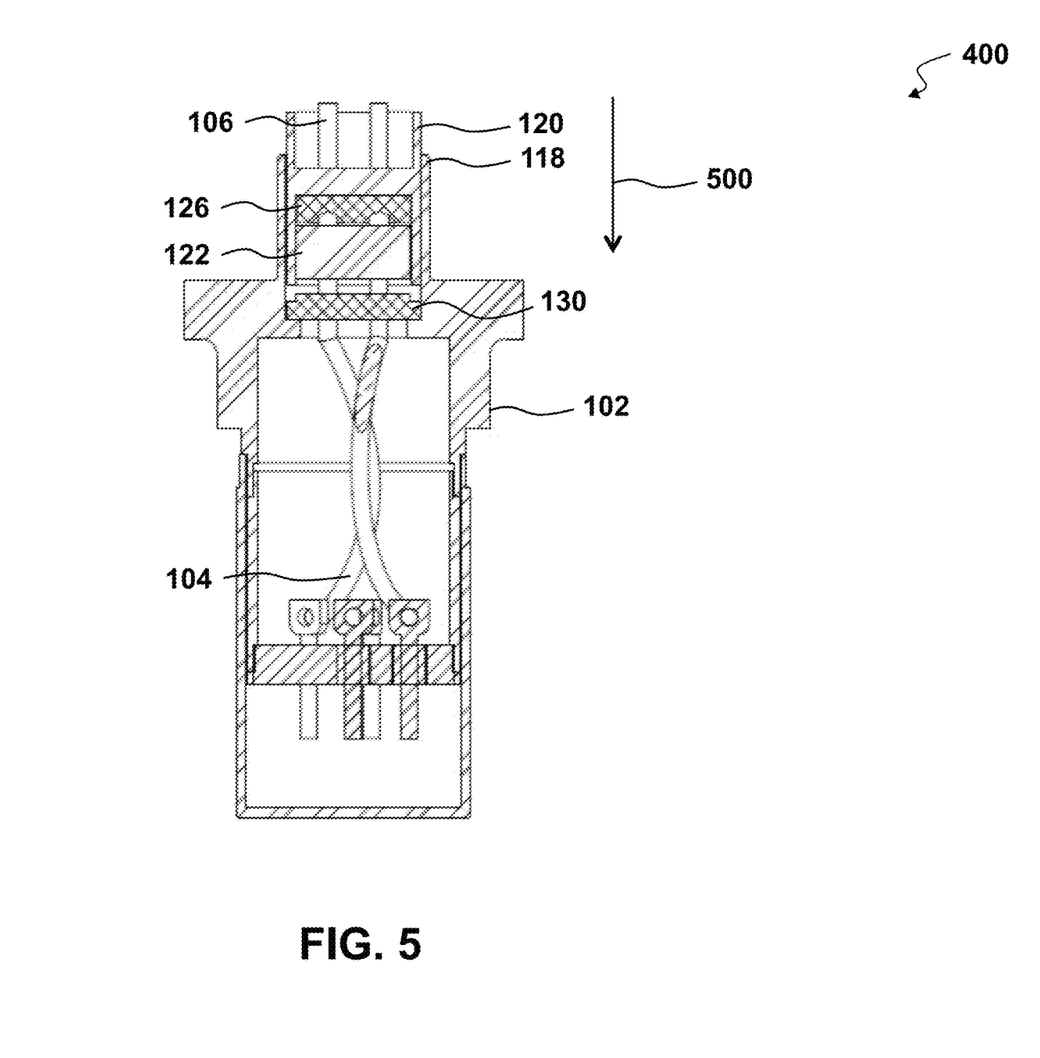
FIG. 5 depicts a cross-section partially assembled view of the system of FIG. 2 about line B-B.

FIG. 5 depicts a cross-section partially assembled view of the system of FIG. 2 about line B-B. As the metal inner housing 120 is inserted 500 into the outer housing 102, the upper plate 126 and lower plate 130 will compress the rubber grommet 122 disposed in-between the upper plate 126 and the lower plate 130. This compression will secure the rubber grommet 122 against the lower portion of the wire 104, the upper portion of the wire 106, and/or the metal isolation break connecting the lower portion of the wire 104 to the upper portion of the wire 106. This compression of the wire prevents moisture intrusion and icing during temperature variations.

Figure 6:
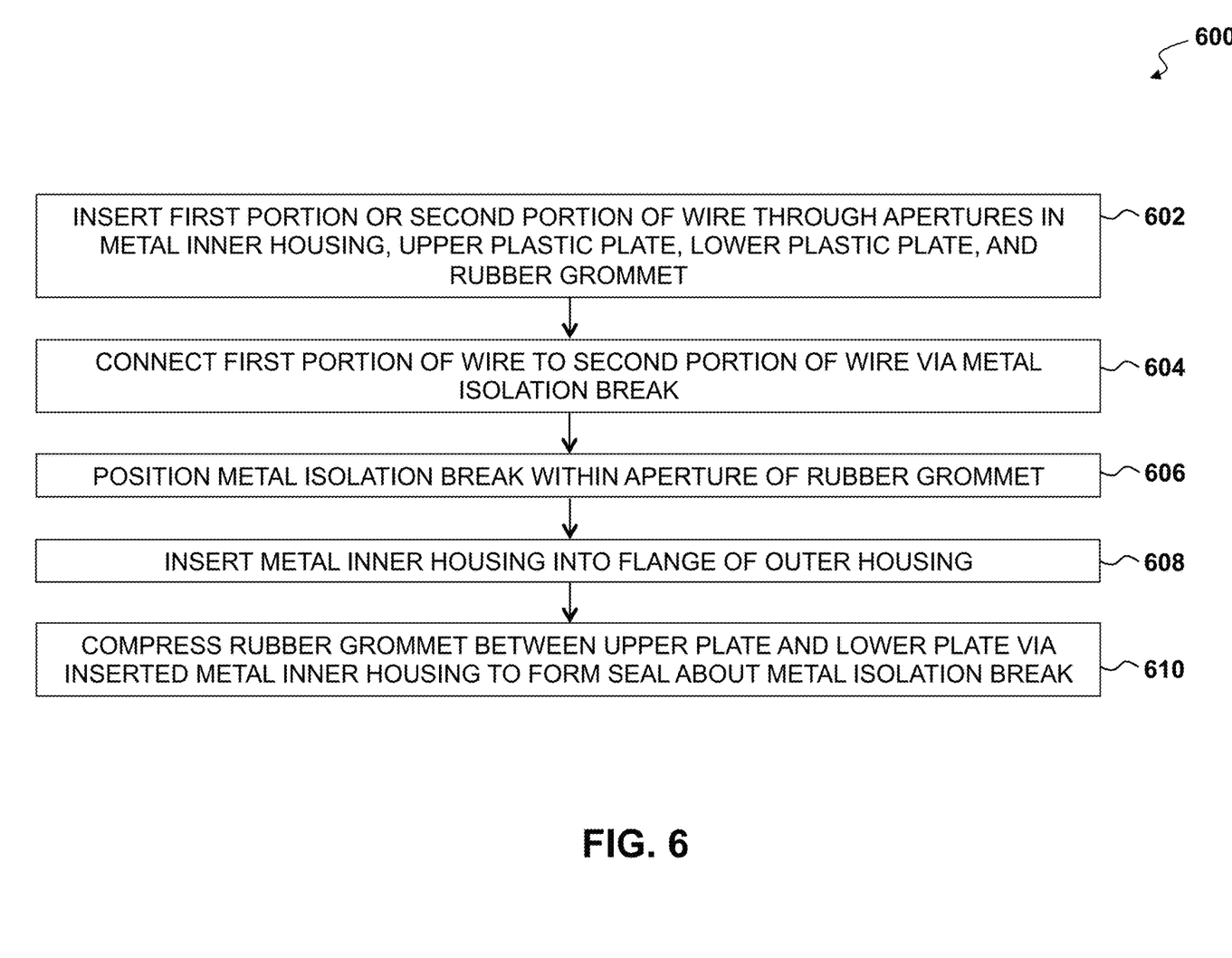
FIG. 6 depicts a block diagram of a method of sealing a cable at an entry point.

FIG. 6 depicts a block diagram of a method 600 of sealing a cable at an entry point. The method 600 may include inserting a first portion or a second portion of a wire through one or more apertures in a metal inner housing, an upper plate, a lower plate, and a rubber grommet (Step 602). One or more first portions of a wire and one or more second portions of a wire may be inserted through one or more first apertures of a metal inner housing, through one or more second apertures of an upper plate, through one or more third apertures of a lower plate, and through one or more fourth apertures of a rubber grommet.

The method 600 may then include connecting the first portion of wire to the second portion of wire via a metal isolation break (Step 604). The method 600 may then include positioning metal isolation breaks within apertures of the rubber grommet (Step 606). The method 600 may then include inserting the metal inner housing into a flange of the outer housing (Step 608). The method 600 may then include compressing the rubber grommet between the upper plate and the lower plate via the inserted metal inner housing to form a seal about the metal isolation break (Step 610). The method 600 may then include compressing the grommet to fill one or more protrusions of the grommet into one or more corresponding indentations of the upper plate.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system comprising:
one or more isolation breaks connected between one or more first portions of a first wire and one or more second portions of a second wire, wherein the one or more isolation breaks prevent moisture intrusion between the one or more first portions of the first wire and the one or more second portions of the second wire;
an inner housing comprising one or more first apertures to receive at least one of: the first wire and the second wire;
an upper compressing plate comprising one or more second apertures to receive at least one of: the first wire and the second wire;
a lower compressing plate comprising one or more third apertures to receive at least one of: the first wire and the second wire;
a grommet comprising one or more fourth apertures to receive at least one of: the one or more isolation breaks, the one or more first portions of the first wire, and the one or more second portions of the second wire, wherein the one or more isolation breaks are within the grommet; and
an outer housing sized to receive the inner housing, wherein the inner housing is placed in at least a portion of the outer housing;
wherein the grommet is disposed between the upper compressing plate and the lower compressing plate;
wherein the inner housing compresses the grommet between the upper compressing plate and the lower compressing plate to form a seal about the one or more isolation breaks; and
wherein the one or more isolation breaks are connected between the one or more first portions of the first wire and the one or more second portions of the second wire prior to compressing the grommet between the upper compressing plate and the lower compressing plate.

2. The system of claim 1, wherein a flow of gas or moisture through one or more inner strands of the one or more first portions of the first wire and one or more inner strands of the one or more second portions of the second wire is blocked by the one or more isolation breaks.

3. The system of claim 1, wherein the inner housing is a metal inner housing and the grommet is a rubber grommet, and wherein the one or more first apertures receive at least one of: the one or more first portions of the first wire and the one or more second portions of the second wire.

4. The system of claim 1, wherein the inner housing comprises a first volume and a second volume.

5. The system of claim 1, wherein the one or more second apertures receive at least one of: the one or more first portions of the first wire and the one or more second portions of the second wire.

6. The system of claim 1, wherein the upper compressing plate further comprises one or more indentations about each of the one or more second apertures.

7. The system of claim 6, wherein the grommet comprises one or more protrusions about each of the one or more fourth apertures.

8. The system of claim 7, wherein the grommet compression fills the one or more protrusions into the one or more indentations.

9. The system of claim 1, wherein the one or more third apertures receive at least one of: the one or more first portions of the first wire and the one or more second portions of the second wire.

10. The system of claim 1, wherein the one or more fourth apertures further receive the one or more first portions of the first wire, and the one or more second portions of the second wire.

11. The system of claim 1, wherein the outer housing comprises a flange sized to receive the inner housing.

12. The system of claim 11, wherein the inner housing is placed in at least a portion of the flange of the outer housing.

13. The system of claim 1, wherein the one or more first apertures, the one or more second apertures, the one or more third apertures, and the one or more fourth apertures are aligned.

14. The system of claim 1, wherein the lower compressing plate is held in place by the outer housing.

15. A method comprising:
inserting at least one of: one or more first portions of a first wire and one or more second portions of a second wire through one or more first apertures of an inner housing, through one or more second apertures of an upper compressing plate, through one or more third apertures of a lower compressing plate, and through one or more fourth apertures of a grommet;
connecting the one or more first portions of the first wire to the one or more second portions of the second wire via one or more isolation breaks, wherein the one or more isolation breaks prevent moisture intrusion between the one or more first portions of the first wire and the one or more second portions of the second wire, wherein each of the one or more isolation breaks includes two pieces that slide into each other as a male and a female; and
inserting the inner housing into at least a portion of an outer housing;
wherein the inner housing compresses the grommet between the upper compressing plate and the lower compressing plate to form a seal about the one or more isolation breaks; and
wherein the one or more isolation breaks are connected between the one or more first portions of the first wire and the one or more second portions of the second wire prior to compressing the grommet between the upper compressing plate and the lower compressing plate.

16. The method of claim 15, further comprising:
blocking, by the one or more isolation breaks, a flow of gas or moisture through one or more inner strands of the one or more first portions of the first wire and one or more inner strands of the one or more second portions of the second wire.

17. The method of claim 15, further comprising:
positioning the one or more isolation breaks within the grommet, wherein the grommet is a rubber grommet, and wherein the inner housing is a metal inner housing.

18. The method of claim 15, wherein the grommet comprises one or more protrusions.

19. The method of claim 18, wherein the upper compressing plate comprises one or more indentations corresponding to the one or more protrusions of the grommet.

20. The method of claim 19 further comprising:
filling the one or more protrusions of the grommet into the one or more corresponding indentations of the upper compressing plate via the compression of the grommet between the upper compressing plate and the lower compressing plate.

* * * * *